US012587354B2

(12) United States Patent
Zerna et al.

(10) Patent No.: US 12,587,354 B2
(45) Date of Patent: Mar. 24, 2026

(54) APPARATUS AND METHOD FOR GENERATING OR RECEIVING A SYNCHRONIZATION HEADER

(71) Applicant: Fraunhofer-Gesellschaft zur Foerderung der angewandten Forschung e.V., Munich (DE)

(72) Inventors: Conrad Zerna, Erlangen (DE); Peter Nagel, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 519 days.

(21) Appl. No.: 18/050,134

(22) Filed: Oct. 27, 2022

(65) Prior Publication Data

US 2023/0155809 A1 May 18, 2023

Related U.S. Application Data

(63) Continuation of application No. PCT/EP2021/061129, filed on Apr. 28, 2021.

(30) Foreign Application Priority Data

Apr. 30, 2020 (WO) ................. PCT/EP2020/062147

(51) Int. Cl.
*H04L 7/00* (2006.01)
*H04L 7/04* (2006.01)
*H04L 69/22* (2022.01)
(52) U.S. Cl.
CPC .................................... *H04L 7/043* (2013.01)
(58) Field of Classification Search
None
See application file for complete search history.

(56) References Cited

U.S. PATENT DOCUMENTS 4,905,234 A 2/1990 Childress et al.
6,643,342 B1 11/2003 Wakabayashi
(Continued)

FOREIGN PATENT DOCUMENTS

CN 109861939 A 6/2019
EP 1061682 A2 12/2000
(Continued)

OTHER PUBLICATIONS

Giordano, Daniele, et al., "Ethernet preamble variation—Use Ethernet preamble to perform frame's classification and a switching optimization", Internet Citation, (Oct. 21, 2007), pp. 1-7, URL: http://tools.ietf.org/id/draft-giordano-ethpre-class-opt-00.txt, (Jan. 28, 2009), XP002512312.

(Continued)

*Primary Examiner* — Duc T Duong
(74) *Attorney, Agent, or Firm* — Perkins Coie LLP; Michael A. Glenn

(57) ABSTRACT

An apparatus for generating a data stream according to an embodiment is provided. The apparatus is configured to generate the data stream, such that the data stream has header data and payload data. The apparatus is configured to generate the header data such that the header data comprises a synchronization header. Moreover, the apparatus is configured to generate the synchronization header using binary coding. Furthermore, the apparatus is configured to generate the synchronization header such that the synchronization header comprises a synchronization sequence being a predefined bit sequence having a plurality of bits.

38 Claims, 8 Drawing Sheets

100

(56) References Cited

U.S. PATENT DOCUMENTS

| | | | |
|---|---|---|---|
| 10,979,210 B1 * | 4/2021 | Jones | H04L 27/04 |
| 11,792,782 B1 * | 10/2023 | Shattil | H04B 7/0452 370/329 |
| 2006/0206642 A1 * | 9/2006 | Wedding | H04L 25/14 710/71 |
| 2010/0135316 A1 * | 6/2010 | Atungsiri | H04L 25/0226 370/474 |
| 2010/0169699 A1 * | 7/2010 | Fujimoto | G06F 1/12 713/503 |
| 2010/0223535 A1 * | 9/2010 | Geng | H04L 1/0057 714/752 |
| 2010/0226467 A1 | 9/2010 | Furukawa et al. | |
| 2011/0134905 A1 * | 6/2011 | Wang | H04L 25/03866 370/345 |
| 2015/0046775 A1 * | 2/2015 | Prodan | H03M 13/09 714/776 |
| 2015/0201296 A1 * | 7/2015 | Oh | G01D 4/002 375/308 |
| 2016/0006560 A1 | 1/2016 | Bernhard et al. | |
| 2016/0261440 A1 | 9/2016 | Jos et al. | |
| 2017/0117979 A1 * | 4/2017 | Sengoku | H04J 3/0605 |
| 2018/0006849 A1 | 1/2018 | Jang | |
| 2018/0191461 A1 * | 7/2018 | Li | H04L 1/0078 |
| 2019/0081761 A1 | 3/2019 | Liu et al. | |
| 2019/0132000 A1 * | 5/2019 | Kim | H04B 10/116 |
| 2019/0349893 A1 | 11/2019 | Li et al. | |
| 2020/0342985 A1 * | 10/2020 | Toth | A61B 5/33 |
| 2021/0135786 A1 * | 5/2021 | Chen | H04L 1/0083 |

FOREIGN PATENT DOCUMENTS

| | | | | |
|---|---|---|---|---|
| EP | 1701460 A1 * | 9/2006 | ............ | H04L 25/14 |
| EP | 2634985 A2 | 9/2013 | | |
| GB | 2004164 A | 3/1979 | | |
| JP | 2000031933 A | 1/2000 | | |
| JP | 2001060915 A | 3/2001 | | |
| JP | 2004266524 A | 9/2004 | | |
| JP | 2010206511 A | 9/2010 | | |
| KR | 20150050456 A | 5/2015 | | |
| KR | 20180091241 A | 8/2018 | | |
| KR | 20190005975 A | 1/2019 | | |
| KR | 20190108142 A | 9/2019 | | |
| WO | 0011831 A2 | 3/2000 | | |

OTHER PUBLICATIONS

Gruenberg, E. L., et al., "Data-Recovery-System Considerations", PCM Telemetry Systems and Remote Control, (Jan. 1, 1967), pp. 30-48, XP000809235.

Hanle, E., "Digital Radar Data Transmission", Advisory Group for Aerospace Research & Development, Proceedings of a Symposium on Data Handling Devices. Istanbul, Jun. 1-4, 1970. [Proceedings of a Symposium on Data Handling Devices], Paris, Agard, FR, (Jun. 1, 1970), vol. Proc. 1970, pp. 14.01-14.12, XP000808380.

Shahrnaz, Azizi, "WUR Preamble Performance Study with Phase Noise and ACI", IEEE Draft; 11-17-1442-00-00BA-WUR-Preamble-Performance-Study-With-Phase-Noise-and-ACI, IEEE-SA Mentor, Piscataway, NJ USA, vol. 802.11ba Sep. 11, 2017 (Sep. 11, 2017), pp. 1-12, XP068117066.

* cited by examiner

| bit position | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| value | 1 | 1 | -1 | 1 | -1 | 1 | -1 | -1 | -1 | -1 | 1 | -1 | -1 | 1 | -1 | 1 | 1 | -1 | -1 | 1 |

| bit position | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| value | 1 | 1 | 1 | 1 | -1 | -1 | -1 | 1 | 1 | -1 | 1 | 1 | 1 | -1 | 1 | -1 | 1 | -1 | -1 | -1 |

Fig. 4

| position | 1 | 2 | 3 | 4 | 5 | 6 | 7 | 8 | 9 | 10 | 11 | 12 | 13 | 14 | 15 | 16 | 17 | 18 | 19 | 20 |
|----------|---|---|---|---|---|---|---|---|---|----|----|----|----|----|----|----|----|----|----|----|
| value    | 1 | 1 | 0 | 1 | 0 | 1 | 0 | 0 | 0 | 0  | 1  | 0  | 0  | 1  | 0  | 1  | 1  | 0  | 0  | 1  |

| position | 21 | 22 | 23 | 24 | 25 | 26 | 27 | 28 | 29 | 30 | 31 | 32 | 33 | 34 | 35 | 36 | 37 | 38 | 39 | 40 |
|----------|----|----|----|----|----|----|----|----|----|----|----|----|----|----|----|----|----|----|----|----|
| value    | 1  | 1  | 1  | 1  | 0  | 0  | 0  | 1  | 1  | 0  | 1  | 1  | 1  | 0  | 1  | 0  | 1  | 0  | 0  | 0  |

Fig. 5

APPARATUS AND METHOD FOR GENERATING OR RECEIVING A SYNCHRONIZATION HEADER

CROSS-REFERENCE TO RELATED APPLICATIONS

This application is a continuation of copending International Application No. PCT/EP2021/061129, filed Apr. 28, 2021, which is incorporated herein by reference in its entirety, and additionally claims priority from International Application No. PCT/EP2020/062147, filed Apr. 30, 2020, which is also incorporated herein by reference in its entirety.

TECHNICAL FIELD

The present invention relates to an apparatus and a method which generate or receive a synchronization header.

BACKGROUND OF THE INVENTION

In most communication systems, bursty transmissions occur. This means, over time there are quiet gaps, where no data is sent, and then, data bursts occur, where payload is transported.

For a plurality of communication systems and communication applications, it is desirable that a receiver recovers timing at the beginning of a data burst.

SUMMARY

An embodiment may have an apparatus for generating a data stream, wherein the apparatus is configured to generate the data stream, such that the data stream has header data and payload data, wherein the apparatus is configured to generate the header data such that the header data has a synchronization header, wherein the apparatus is configured to generate the synchronization header using binary coding, wherein the apparatus is configured to generate the synchronization header such that the synchronization header has a synchronization sequence being a predefined bit sequence having a plurality of bits.

Another embodiment may have an apparatus for receiving a data stream, wherein the data stream has header data and payload data, wherein the header data has a synchronization header, wherein the synchronization header is binary encoded, wherein the synchronization header has a synchronization sequence being a predefined bit sequence having a plurality of bits, wherein the apparatus is configured to obtain the payload data of the data stream using the synchronization sequence of the synchronization header of the data stream.

According to another embodiment, a system may have: an inventive an apparatus for generating a data stream as mentioned above, and an inventive an apparatus for receiving a data stream as mentioned above, wherein the apparatus for generating a data stream is configured to generate the data stream, such that the data stream has header data and payload data, wherein the apparatus for generating a data stream is configured to generate the header data such that the header data has a synchronization header, wherein the apparatus for generating a data stream is configured to generate the synchronization header using binary coding, wherein the apparatus for generating a data stream is configured to generate the synchronization header such that the synchronization header has a synchronization sequence being a predefined bit sequence having a plurality of bits, wherein the apparatus for receiving a data stream is configured to obtain the payload data of the data stream using the synchronization sequence of the synchronization header of the data stream.

According to another embodiment, a method for generating a data stream may have the step of: generating the data stream, such that the data stream has header data and payload data, wherein generating the header data is conducted such that the header data has a synchronization header, wherein generating the synchronization header is conducted using binary coding, wherein generating the synchronization header is conducted such that the synchronization header has a synchronization sequence being a predefined bit sequence having a plurality of bits.

Another embodiment may have a method for receiving a data stream, wherein the data stream has header data and payload data, wherein the header data has a synchronization header, wherein the synchronization header is binary encoded, wherein the synchronization header has a synchronization sequence being a predefined bit sequence having a plurality of bits, wherein the method has obtaining the payload data of the data stream using the synchronization sequence of the synchronization header of the data stream.

Still another embodiment may have a non-transitory digital storage medium having stored thereon a computer program for performing the above inventive methods method for generating a data stream and for receiving a data stream, when said computer program is run by a computer.

Another embodiment may have a data stream having header data and payload data, wherein the header data has a synchronization header, wherein the synchronization header is binary encoded, and wherein the synchronization header has a synchronization sequence being a predefined bit sequence having a plurality of bits.

An apparatus for generating a data stream according to an embodiment is provided. The apparatus is configured to generate the data stream, such that the data stream comprises header data and payload data. The apparatus is configured to generate the header data such that the header data comprises a synchronization header. Moreover, the apparatus is configured to generate the synchronization header using binary coding. Furthermore, the apparatus is configured to generate the synchronization header such that the synchronization header comprises a synchronization sequence being a predefined bit sequence comprising a plurality of bits.

Moreover, an apparatus for receiving a data stream according to an embodiment is provided. The data stream comprises header data and payload data. The header data comprises a synchronization header. The synchronization header is binary encoded, wherein the synchronization header comprises a synchronization sequence being a predefined bit sequence comprising a plurality of bits. The apparatus is configured to obtain the payload data of the data stream using the synchronization sequence of the synchronization header of the data stream.

Furthermore, a system is provided. The system comprises an apparatus according for generating a data stream and an apparatus for receiving the data stream. The apparatus for generating the data stream is configured to generate the data stream, such that the data stream comprises header data and payload data. Moreover, the apparatus for generating the data stream is configured to generate the header data such that the header data comprises a synchronization header. Furthermore, the apparatus for generating the data stream is configured to generate the synchronization header using binary coding, wherein the apparatus for generating a data stream is configured to generate the synchronization header such that the synchronization header comprises a synchronization sequence being a predefined bit sequence comprising a plurality of bits. The apparatus for receiving the data stream is configured to obtain the payload data of the data stream using the synchronization sequence of the synchronization header of the data stream.

Moreover, a method for generating a data stream according to an embodiment is provided. The method comprises generating the data stream, such that the data stream comprises header data and payload data. Generating the header data is conducted such that the header data comprises a synchronization header. Generating the synchronization header is conducted using binary coding. Generating the synchronization header is conducted such that the synchronization header comprises a synchronization sequence being a predefined bit sequence comprising a plurality of bits.

Furthermore, a method for receiving a data stream according to an embodiment is provided. The data stream comprises header data and payload data. The header data comprises a synchronization header. The synchronization header is binary encoded, wherein the synchronization header comprises a synchronization sequence being a predefined bit sequence comprising a plurality of bits. The method comprises obtaining the payload data of the data stream using the synchronization sequence of the synchronization header of the data stream.

Moreover, computer programs are provided, wherein each of the computer programs is configured to implement one of the above-described methods when being executed on a computer or signal processor.

Furthermore, a data stream comprising header data and payload data according to an embodiment is provided. The header data comprises a synchronization header. The synchronization header is binary encoded. Moreover, the synchronization header comprises a synchronization sequence being a predefined bit sequence comprising a plurality of bits.

BRIEF DESCRIPTION OF THE DRAWINGS

In the following, embodiments of the present invention are described in more detail with reference to the figures, in which:

FIG. 4 illustrates an example of a synchronization sequence in a PAM representation according to an embodiment;

FIG. 5 illustrates the synchronization sequence of the embodiment depicted by FIG. 4 in a 0/1 representation;

DETAILED DESCRIPTION OF THE INVENTION

Figure 1:
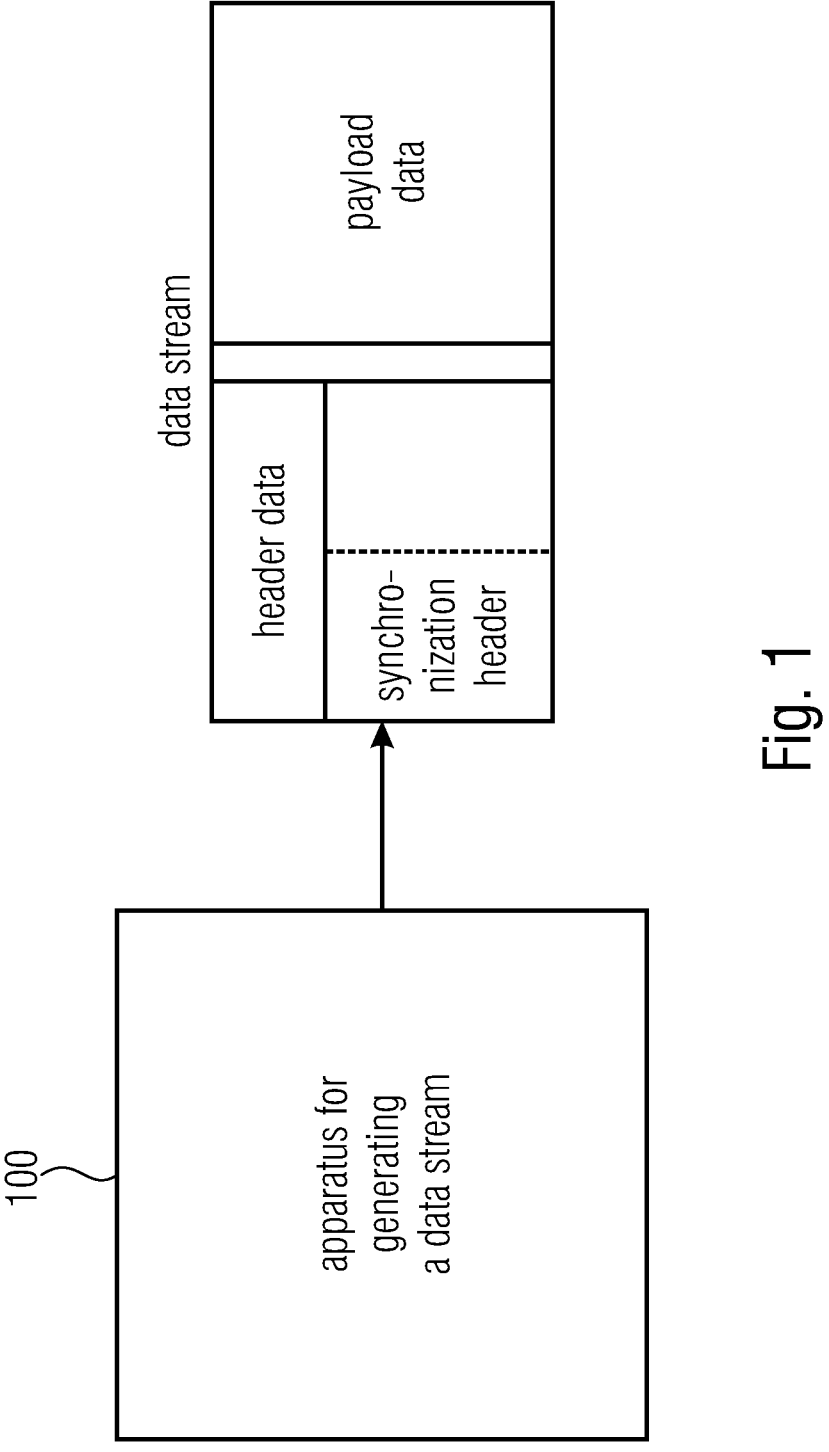
FIG. 1 illustrates an apparatus for generating a data stream according to an embodiment.

FIG. 1 illustrates an apparatus 100 for generating a data stream according to an embodiment.

The apparatus 100 is configured to generate the data stream, such that the data stream comprises header data and payload data.

The apparatus 100 is configured to generate the header data such that the header data comprises a synchronization header. Moreover, the apparatus 100 is configured to generate the synchronization header using binary coding.

Furthermore, the apparatus 100 is configured to generate the synchronization header such that the synchronization header comprises a synchronization sequence being a predefined bit sequence comprising a plurality of bits.

According to an embodiment, the apparatus 100 may, e.g., be configured to generate the synchronization sequence which comprises a number of bits, such that a total number of transitions from a first bit value to a second bit value, being different from the first bit value, and from the second bit value to the first bit value within the synchronization sequence is greater than or equal to 35% of the number of the bits of the synchronization sequence.

In an embodiment, the apparatus 100 may, e.g., be configured to generate the synchronization sequence such that the total number of transitions within the synchronization sequence is greater than or equal to 50% of the number of the bits of the synchronization sequence.

According to an embodiment, the apparatus 100 may, e.g., be configured to generate the synchronization header such that the synchronization header comprises a pseudo-random binary sequence.

In an embodiment, the apparatus 100 may, e.g., be configured to generate the synchronization sequence, which comprises a first number of bits, such that a first ratio of a first total number of transitions from a first bit value to a second bit value, being different from the first bit value, and from the second bit value to the first bit value within the synchronization sequence to the first number of bits, is greater than a second ratio of a second total number of transitions from the first bit value to the second bit value, and from the second bit value to the first bit value within the pseudo-random binary sequence, which comprises a second number of bits, to the second number of bits.

In an embodiment, the apparatus 100 may, e.g., be configured to generate the pseudo-random binary sequence by employing a linear feedback shift register.

According to an embodiment, the apparatus 100 may, e.g., be configured to generate the pseudo-random binary sequence such that the pseudo-random binary sequence is different from the synchronization sequence.

According to an embodiment, the apparatus 100 may, e.g., be configured to generate the pseudo-random binary sequence (PRBS) only partially by starting with a defined seed value and running for a predefined number of shifts before resetting to the seed value. The seed value and the run length may, for example, be chosen in such a way, that the longest same symbol run lengths close to the PRBS order are not included in the used fragment of PRBS. This avoids longer dead times for the CDR while still providing high variability in the bit pattern.

In an embodiment, the apparatus 100 may, e.g., be configured to generate the pseudo-random binary sequence which comprises a number of bits, such that a total number of transitions from a first bit value to a second bit value, being different from the first bit value, and from the second bit value to the first bit value within the pseudo-random binary sequence is greater than or equal to 15% of the number of the bits of the pseudo-random binary sequence.

For example, the sequence 0001110001 comprises 10 bits, two transitions from 0 to 1 and one transition from 1 to 0, i.e., a total number of transitions of 3. In this example of the sequence 0001110001, the total number of transitions is not greater than or equal to 30% of the number of bits of the sequence (in fact, it is 30%=3/10).

In another example, the sequence 0101010101 comprises 10 bits, five transitions from 0 to 1 and four transitions from 1 to 0, i.e., a total number of transitions of 9. In this example of the sequence 0101010101 is greater than or equal to 30% of the number of bits of the sequence (in fact, it is 90%=9/10).

For example, the synchronization sequence illustrated by FIG. 4 or FIG. 5 has 40 bit values and a total number of 21 transitions (10 transitions from −1 to +1/from 0 to 1, and 11 transitions from +1 to −1/from 1 to 0). This results in a total number of transitions to number of bits value of 21/40=52.5%.

According to an embodiment, the apparatus 100 may, e.g., be configured to generate the pseudo-random binary sequence such that the total number of transitions within the pseudo-random binary sequence is greater than or equal to 30% of the number of the bits of the pseudo-random binary sequence.

To find a synchronization sequence by correlation efficiently, the portions near the synchronization sequence (here, e.g., the PRBS-base sequence) should have a different density of transitions compared to the synchronization sequence. A high density may, e.g., come together with short (sub)sequences of same symbols, and many repetitions may, e.g., occur, such that the portions of the base sequence resemble the synchronization sequence to a higher degree. Additionally, with high density of transitions, much energy is concentrated in a narrow frequency band what results in a higher energy emission.

In an embodiment, a 40 bits synchronization sequence, e.g., the 40 bits synchronization sequence of FIG. 4 and FIG. 5 may, e.g., be dithered, to avoid that too much energy is emitted.

According to an embodiment, for example, PRBS10 to PRBS30 may, e.g., be employed for the pseudo-random binary sequence.

A PRBS10 generates a sequence of length $2^{10}$−1 of pseudo random values. Afterwards, the sequence generates the same previous values again (repeats the previous values).

A PRBS30 generates a sequence of length $2^{30}$−1 of pseudo random values. Afterwards, the sequence generates the same previous values again (repeats the previous values).

In general, a PRBSx generates a sequence of length $2^x$−1 of pseudo random values. Afterwards, the sequence generates the same previous values again (repeats the previous values).

In an embodiment, the pseudo-random binary sequence may, e.g., be a selected pseudo-random binary sequence, and the apparatus 100 may, e.g., be configured to generate an initial pseudo-random binary sequence and to select a portion of the initial pseudo-random binary sequence, being smaller than the initial pseudo-random binary sequence, as the selected pseudo-random binary sequence. This has the advantage that a PRBSx with a larger than necessary x may, e.g., be employed, such that more randomness is created in the final selected PRBS.

For example, in an embodiment, a portion of a PRBS19 sequence may, e.g., be used, wherein the PRBS 19 sequence may, e.g., be different from a sequence comprising 19 succeeding 1 values (and, e.g., different from a sequence comprising 19 succeeding 0 values). In general, enough transitions will result while, at the same time, in general, enough variability will be present in the sequence. Thus, a compromise between fast-locking CDR and low emission is achieved.

In an embodiment, the apparatus 100 may, e.g., be configured to assign a bit of the pseudo-random binary sequence to a bit position of the synchronization header where the apparatus 100 may, e.g., be configured to insert a bit of the synchronization sequence, but may, e.g., be configured to not insert said bit of the pseudo-random binary sequence into the synchronization header.

According to an embodiment, the apparatus 100 may, e.g., be configured to stop using bits of the pseudo-random binary sequence when the apparatus 100 inserts bits of the synchronization sequence into the synchronization header. The apparatus 100 may, e.g., be configured to continue to insert a next bit of the pseudo-random binary sequence into the synchronization header, after the apparatus 100 has inserted the bits of the synchronization sequence into the synchronization header.

In an embodiment, the apparatus 100 may, e.g., be configured to insert a doubling or tripling of each of two or more bits of the pseudo-random binary sequence into the synchronization header.

According to an embodiment, the apparatus 100 may, e.g., be configured to generate the synchronization header such that the synchronization header comprises the synchronization sequence at least twice, e.g., such that the synchronization header comprises the synchronization sequence at least twice.

In an embodiment, the apparatus 100 may, e.g., be configured to generate the synchronization header such that the synchronization header comprises the synchronization sequence more than twice.

According to an embodiment, the apparatus 100 may, e.g., be configured to generate the synchronization header such that the synchronization header may, e.g., comprise the synchronization sequence at a beginning of the synchronization header, and such that the synchronization header may, e.g., comprise the synchronization sequence at an end of the synchronization header.

In an embodiment, the apparatus 100 may, e.g., be configured to generate the synchronization header such that the synchronization header comprises the synchronization sequence two times, concatenated, at the beginning of the synchronization header, and two times, concatenated, at the end of the synchronization header. In other words, at the beginning of the synchronization header, the synchronization header comprises a concatenation of two synchronization sequences, and at the end of the synchronization header, the synchronization header comprises also a concatenation of two synchronization sequences.

According to an embodiment, the apparatus 100 may, e.g., be configured to generate the synchronization header such that a second appearance of the synchronization sequence occurs immediately after a first appearance of the synchronization sequence within the synchronization header.

In an embodiment, the synchronization sequence may, e.g., be a first synchronization sequence. The apparatus 100 may, e.g., be configured to generate the header data such that the header data comprises the first synchronization sequence and a second synchronisation sequence, the second synchronization sequence being different from the first synchronization sequence.

According to an embodiment, the apparatus 100 may, e.g., be configured to generate the synchronization header such that the synchronization header comprises the first synchronization sequence and the second synchronization sequence.

In an embodiment, the apparatus 100 may, e.g., be configured to generate the synchronization header which comprises a number of bits, such that a total number of transitions from a first bit value to a second bit value, being different from the first bit value, and from the second bit value to the first bit value within the synchronization header is greater than or equal to 15% of the number of the bits of the synchronization header.

According to an embodiment, the apparatus 100 may, e.g., be configured to generate the synchronization header such that the total number of transitions within the synchronization header is greater than or equal to 30% of the number of the bits of the synchronization header.

In an embodiment, the apparatus 100 may, e.g., be configured to generate the synchronization header such that the synchronization header comprises a predefined short code.

According to an embodiment, the apparatus 100 may, e.g., be configured to generate the synchronization header such that the predefined short code is 8B10B and 4B5B.

In an embodiment, the apparatus 100 may, e.g., be configured to generate a first version of the synchronization sequence by doubling or tripling each bit of an initial sequence, and wherein the apparatus 100 may, e.g., be configured to generate the header data such that the synchronization header comprises the first version of the synchronization sequence.

According to an embodiment, the apparatus 100 may, e.g., be configured to generate the header data such that the synchronization header furthermore comprises a second version of the synchronization sequence, wherein the second version of the synchronization sequence is equal to the initial sequence.

In an embodiment, the apparatus 100 may, e.g., be configured to generate the header data such that the first version of the synchronization sequence precedes the second version of the synchronization sequence within the header data.

According to an embodiment, the apparatus 100 may, e.g., be configured to obtain the synchronization sequence from the initial sequence by changing positions of bits of the initial sequence.

In an embodiment, the apparatus 100 may, e.g., be configured to change the positions of the bits of the initial sequence depending on a defined waveform.

According to an embodiment, the defined waveform may, e.g., have a triangle shape or may, e.g., be a sine wave or may, e.g., have a rectangular shape or may, e.g., have a sawtooth shape.

In an embodiment, the apparatus 100 may, e.g., be configured to employ a clocked digital waveform for changing the positions of the bits of the initial sequence.

According to an embodiment, the apparatus 100 may, e.g., be configured to change the positions of the bits of the initial sequence depending on a pseudo-random signal.

In an embodiment, the apparatus 100 may, e.g., be configured to change the positions of the bits of the initial sequence depending on a multiplication factor wherein the multiplication factor depends on how many times the synchronization sequence has already been inserted by the apparatus 100 into the header data.

According to an embodiment, for a second insertion of the synchronization sequence into the synchronization header, a second value of the multiplication factor may, e.g., be half of a first value of the multiplication factor used for a first insertion of the synchronization sequence into the header data.

In an embodiment, the first value of the multiplication factor may, e.g., be 2, and wherein the second value of the multiplication factor may, e.g., be 1.

According to an embodiment, the apparatus 100 may, e.g., be configured to generate the synchronization header such that the synchronization header comprises a predefined field into the synchronization header to indicate that the synchronization header has a predefined length.

In an embodiment, the apparatus 100 may, e.g., be configured to generate the synchronization header such that the synchronization header comprises an information field having a predefined length, wherein the information field comprises additional information.

According to an embodiment, the apparatus 100 may, e.g., be configured to generate the data stream such that the synchronization header of the data stream precedes the payload data of the data stream within the data stream.

In an embodiment, the apparatus 100 may, e.g., be configured to generate the data stream such that the payload data is binary encoded.

According to an embodiment, the apparatus 100 may, e.g., be configured to generate the data stream such that the payload data is multi-level encoded.

In an embodiment, the apparatus 100 may, e.g., be configured to generate the synchronization header such that the synchronization header has a predefined length.

According to an embodiment, the apparatus 100 may, e.g., be configured to generate the synchronization header such that the synchronization header comprises two or more predefined header fields.

In an embodiment, the apparatus 100 may, e.g., be configured to generate the data stream using pulse amplitude modulation.

According to an embodiment, the apparatus 100 may, e.g., be configured to transmit the data stream to a receiver.

In an embodiment, the apparatus 100 may, e.g., be configured to transmit the data stream via a shared medium.

According to an embodiment, the apparatus 100 may, e.g., be suitable for being employed in an automotive environment or in an aerospace environment.

Figure 2:
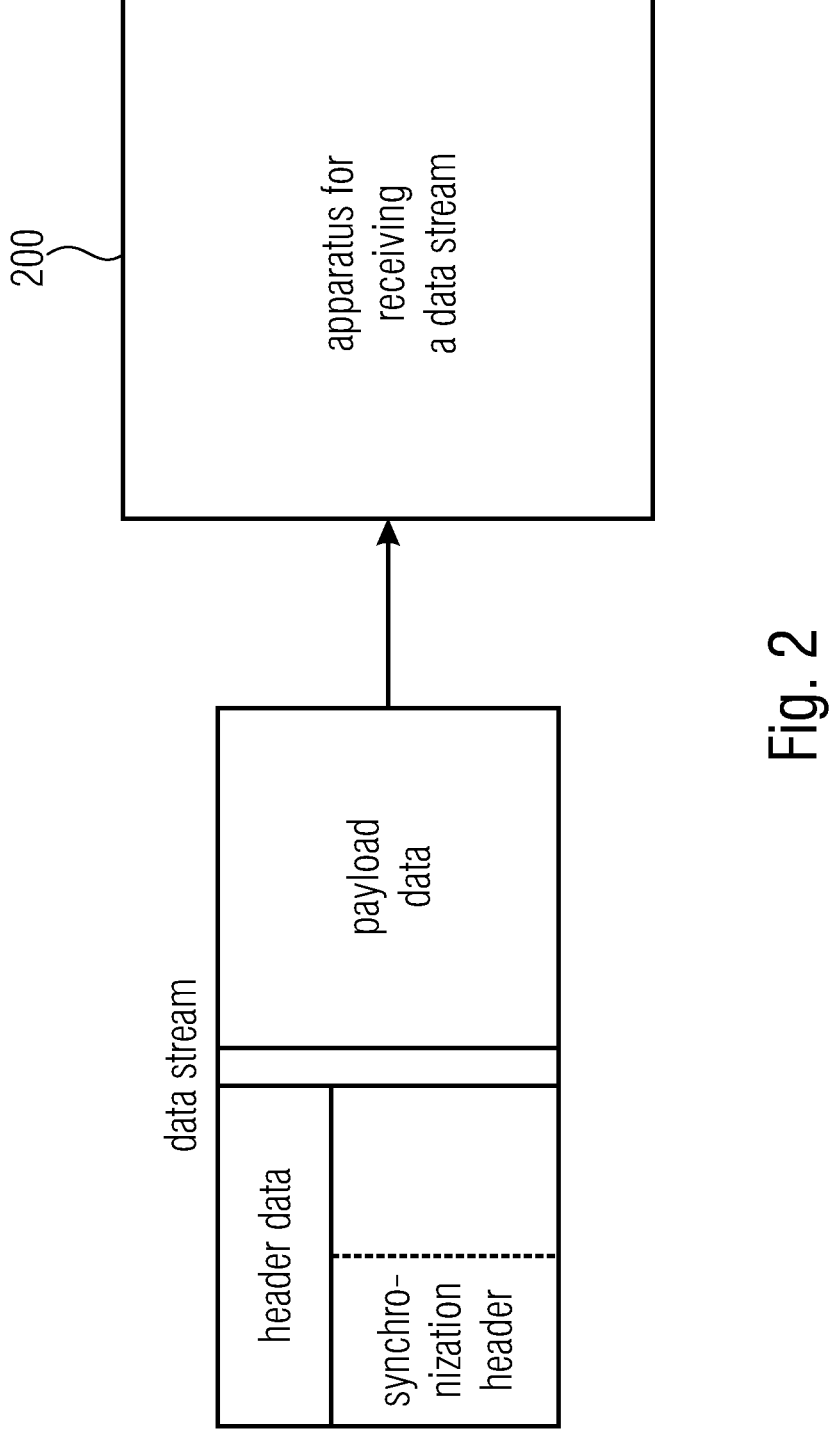
FIG. 2 illustrates an apparatus for receiving a data stream according to an embodiment.

FIG. 2 illustrates an apparatus 200 for receiving a data stream according to an embodiment.

The data stream comprises header data and payload data. The header data comprises a synchronization header. The synchronization header is binary encoded, wherein the synchronization header comprises a synchronization sequence being a predefined bit sequence comprising a plurality of bits.

According to an embodiment, the synchronization sequence may, e.g., comprise a number of bits. A total number of transitions a first bit value to a second bit value, being different from the first bit value, and from the second bit value to the first bit value within the synchronization sequence may, e.g., be greater than or equal to 35% of the number of the bits of the synchronization sequence.

In an embodiment, the total number of transitions within the synchronization sequence may, e.g., be greater than or equal to 50% of the number of the bits of the synchronization sequence.

According to an embodiment, the synchronization header may, e.g., comprise a pseudo-random binary sequence.

In an embodiment, the synchronization sequence may, e.g., comprise a first number of bits.

A first ratio of a first total number of transitions from a first bit value to a second bit value, being different from the first bit value, and from the second bit value to the first bit value within the synchronization sequence to the first number of bits, may, e.g., be greater than a second ratio of a second total number of transitions from the first bit value to the second bit value, and from the second bit value to the first bit value within the pseudo-random binary sequence, which comprises a second number of bits, to the second number of bits.

According to an embodiment, the apparatus 200 may, e.g., be configured to synchronize a clock timing using the synchronization sequence of the synchronization header of the data stream. The apparatus 200 may, e.g., be configured to obtain the payload data of the data stream using the using the clock timing.

In an embodiment, the apparatus 200 may, e.g., be configured to synchronize a phase of a sampling clock (a sampling phase) using the synchronization sequence of the synchronization header of the data stream to synchronize the clock timing.

According to an embodiment, the synchronization header comprises a pseudo-random binary sequence.

In an embodiment, the pseudo-random binary sequence may, e.g., be different from the synchronization sequence.

According to an embodiment, the pseudo-random binary sequence may, e.g., comprise a number of bits, wherein a total number of transitions from a first bit value to a second bit value, being different from the first bit value, and from the second bit value to the first bit value within the pseudo-random binary sequence is greater than or equal to 15% of the number of the bits of the pseudo-random binary sequence.

In an embodiment, the total number of transitions within the pseudo-random binary sequence may, e.g., be greater than or equal to 30% of the number of the bits of the pseudo-random binary sequence.

According to an embodiment, the synchronization header may, e.g., comprise a doubling or tripling of each of two or more bits of the pseudo-random binary sequence.

In an embodiment, the synchronization header may, e.g., comprise the synchronization sequence at least twice, e.g., the synchronization header may, e.g., comprise the synchronization sequence at least twice.

According to an embodiment, the synchronization header may, e.g., comprise the synchronization sequence more than twice.

In an embodiment, the synchronization header may, e.g., comprise the synchronization sequence at a beginning of the synchronization header, and the synchronization header may, e.g., comprise the synchronization sequence at an end of the synchronization header.

According to an embodiment, the synchronization header may, e.g., comprise the synchronization sequence two times, concatenated, at the beginning of the synchronization header, and two times, concatenated, at the end of the synchronization header.

In an embodiment, a second appearance of the synchronization sequence may, e.g., occur immediately after a first appearance of the synchronization sequence within the synchronization header.

According to an embodiment, the synchronization sequence may, e.g., be a first synchronization sequence. The apparatus 100 may, e.g., be configured to generate the header data such that the header data comprises the first synchronization sequence and a second synchronisation sequence, the second synchronization sequence being different from the first synchronization sequence.

In an embodiment, the apparatus 100 may, e.g., be configured to generate the synchronization header such that the synchronization header comprises the first synchronization sequence and the second synchronization sequence.

According to an embodiment, the synchronization header may, e.g., comprise a number of bits, such that a total number of transitions from a first bit value to a second bit value, being different from the first bit value, and from the second bit value to the first bit value within the synchronization header may, e.g., be greater than or equal to 15% of the number of the bits of the synchronization header.

In an embodiment, the total number of transitions within the synchronization header may, e.g., be greater than or equal to 30% of the number of the bits of the synchronization header.

According to an embodiment, the synchronization header may, e.g., comprise a predefined short code.

In an embodiment, the predefined short code may, e.g., be 8B10B and 4B5B.

According to an embodiment, the synchronization header may, e.g., comprise a first version of the synchronization sequence, the first version comprising a doubling or tripling each bit of an initial sequence.

In an embodiment, the synchronization header may, e.g., furthermore comprise a second version of the synchronization sequence, wherein the second version of the synchronization sequence may, e.g., be equal to the initial sequence.

According to an embodiment, the first version of the synchronization sequence may, e.g., precede the second version of the synchronization sequence within the header data.

In an embodiment, the synchronization header may, e.g., comprise a predefined field into the synchronization header to indicate that the synchronization header has a predefined length.

According to an embodiment, the synchronization header may, e.g., comprise an information field having a predefined length, wherein the information field comprises additional information.

In an embodiment, the synchronization header of the data stream may, e.g., precede the payload data of the data stream within the data stream.

According to an embodiment, the payload data may, e.g., be binary encoded.

In an embodiment, the payload data may, e.g., be multi-level encoded.

According to an embodiment, the synchronization header may, e.g., have a predefined length.

In an embodiment, the synchronization header may, e.g., comprise two or more predefined header fields.

According to an embodiment, the data stream may, e.g., be pulse amplitude modulation encoded.

In an embodiment, the apparatus 200 may, e.g., be configured to receive the data stream from a transmitter.

According to an embodiment, the apparatus 200 may, e.g., be configured to receive the data stream via a shared medium.

In an embodiment, the apparatus 200 may, e.g., be suitable for being employed in an automotive environment or in an aerospace environment.

According to an embodiment, the apparatus 200 may, e.g., be configured to recover the clock timing using the synchronization header when the apparatus 200 starts to receive the data stream.

In an embodiment, the apparatus 200 may, e.g., be configured to recover the clock timing using the synchronization header.

According to an embodiment, the apparatus 200 may, e.g., be configured to track a frequency of the clock timing during a reception of the data stream.

In an embodiment, the apparatus 200 may, e.g., be configured to detect a beginning of the payload data of the data stream using the synchronization sequence.

According to an embodiment, the apparatus 200 may, e.g., be configured to center the sampling clock in a symbol period using the synchronization header.

In an embodiment, the apparatus 200 may, e.g., be configured to recover the clock timing using the pseudo-random binary sequence.

According to an embodiment, the apparatus 200 may, e.g., be configured to identify the synchronization sequence within the data stream by employing correlation.

Figure 3:
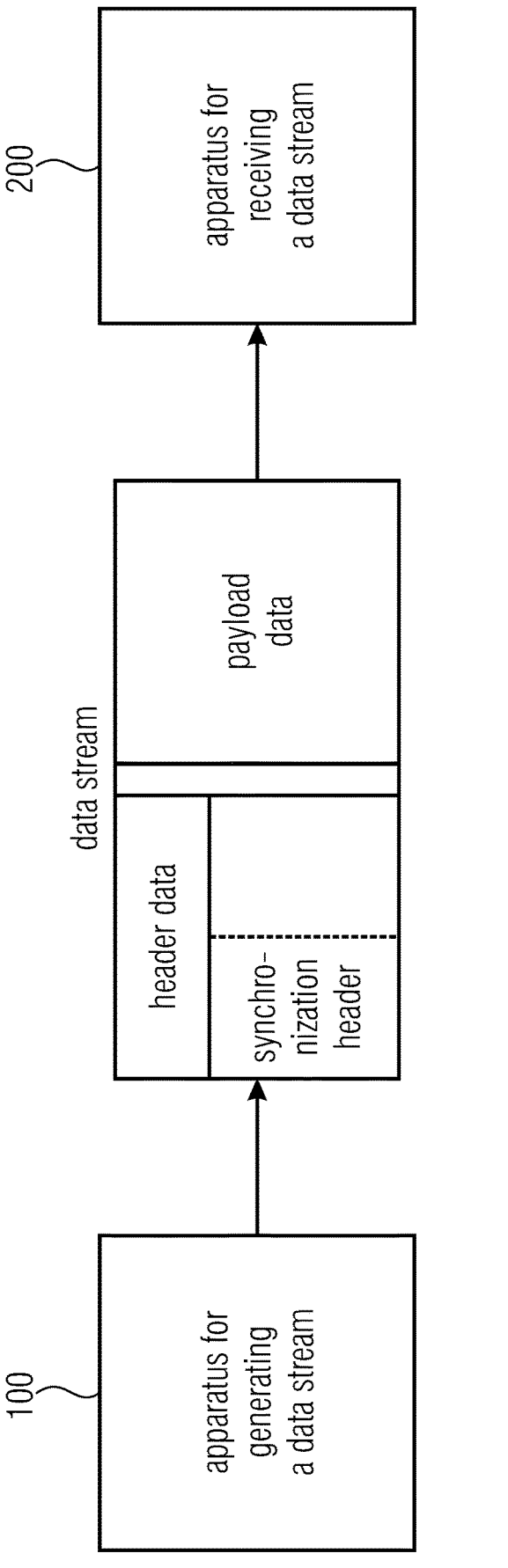
FIG. 3 illustrates a system according to an embodiment.

FIG. 3 illustrates a system according to an embodiment.

The system comprises an apparatus 100 according for generating a data stream and an apparatus 200 for receiving the data stream.

The apparatus 100 for generating the data stream is configured to generate the data stream, such that the data stream comprises header data and payload data. Moreover, the apparatus 100 for generating the data stream is configured to generate the header data such that the header data comprises a synchronization header. Furthermore, the apparatus 100 for generating the data stream is configured to generate the synchronization header using binary coding, wherein the apparatus 100 for generating a data stream is configured to generate the synchronization header such that the synchronization header comprises a synchronization sequence being a predefined bit sequence comprising a plurality of bits.

The apparatus 200 for receiving the data stream is configured to synchronize a clock timing using the synchronization sequence of the synchronization header of the data stream. Moreover, the apparatus 200 for receiving the data stream is configured to obtain the payload data of the data stream using the clock timing.

In the following, further embodiments of the present invention are provided.

Some of the embodiments relate to data communication systems with bursty transmissions. As already outlined, this means, over time there are quiet gaps, where no data is sent, and then, data bursts occur, where payload is transported.

In this mode, the receiver is to recover timing at the beginning of a data burst. This is mostly the phase of the sampling clock as frequency will tracked/recovered during the entire data burst. For this purpose, the data burst is preceded by a synchronization header (in short, also referred to as sync header).

In an embodiment, the quiet gap is for the purpose of a power saving a state of the data communication link and/or for a shared medium, for example, half-duplex data communication (on a cable, directional RF link, optical fiber or similar).

According to an embodiment, the transition from the quiet gap to payload inside the data burst is to happen fast for bandwidth efficiency and power efficiency as this transition phase neither carries payload data nor is saving power.

In an embodiment, each data burst is preceded by a synchronization or resynchronization header (sync header). This sync header is used for robust detection of the symbol position, so that the beginning of payload is known and data can be decoded correctly. When in the following, reference is made to a synchronization header, it is understood that in a particular, a synchronization header may, for example, be a resynchronization header.

The sync header may, e.g., also be used by the receiver for clock (phase) recovery to center the sampling clock to achieve the target signal-to-noise-ratio, when the payload starts.

At the same time, the sync header may, e.g., have properties to limit/avoid emissions because of a recurring identical sequence. This is especially important for a cycle of data burst and quiet gap with fixed periodic timing.

While the payload may, e.g., be implemented by any sort of coding (binary or multi-level), the sync header may, e.g., be implemented using binary coding for more robustness in detection and clear symbol transitions for a fast-locking CDR (clock and data recovery).

In an embodiment, the sync header may, e.g., in principle be of fixed length. One optional exception is mentioned below. The sync header may, e.g., be constructed from several fields, at least 5 or 6.

In an alternative embodiment, an alternate description would be that there is a base pattern, into which at least two distinct patterns (called a synchronization sequence, in short: a sync sequence) are inserted (replacing parts of the base pattern). The sync sequence may, e.g., be inserted more than twice, which effectively creates a sync header with more than 5 or 6 fields.

According to an embodiment, the base pattern may, e.g., be used for phase recovery. It should therefore have a high enough transition density to allow the CDR to correct larger offsets fast. Patterns like a simple one-zero alternating or code words from short codes like 8B10B and 4B5B provide this property. However, the regular nature of these patterns also leads to peak/tones in the spectrum.

A class of patterns with statistically distributed edge density (same symbol running length) between 1 and some maximum value are PRBS (pseudo-random binary sequence), which can be generated by a linear feedback shift register (LFSR).

The order of the PRBS is advantageously one with many symbol transitions (short same symbol run lengths) to enable faster CDR locking. At the same time, the PRBS has to be distinct enough from the sync sequence, so that the correlation of the sync sequence versus the sync header (distorted by the channel) does not yield false positives. Such a PRBS order would be, for example, in the range from 10 to 19.

In an embodiment, the sync sequence may, e.g., be a defined bit sequence, which can be found well by correlation.

FIG. 4 illustrates an example of a synchronization sequence being represented by −1 and +1 values according to an embodiment (PAM representation).

FIG. 5 illustrates the synchronization sequence of FIG. 4, wherein the synchronization sequence is represented by 0 and 1 values (0/1 representation).

In an embodiment, a value may, e.g., be mapped already to PAM2 signal levels (PAM2: pulse amplitude modulation 2). The 0/1 sequence may, e.g., be obtained by setting all '−1' values to '0'. Any circular permutations and any inversion of circular permutations may, e.g., yield a sequence of comparable properties. Reversing the bit order of any of those permutations/inversions also keeps comparable properties.

The exact length of the sequence is secondary. However, this sequence has the important property of being robust in detection mixed in with a base PRBS of orders 10 and above. In a concatenation of those sequences, an inversion of the sync sequence (receiver input inverted) can also be easily found and hence corrected. To detect the inversion of a PRBS, close to the full PRBS sequence is searched for by correlation.

According to an embodiment, the sync sequence may, e.g., be inserted in the sync header at the beginning and at the end. This may, for example, be done each time with a single instance of the sync sequence or two or more concatenated sync sequences.

In an embodiment, the sync sequence may, e.g., be inserted multiple times with a defined distance (in time). This can help detection robustness, because the distance of correlation peaks can be evaluated.

Alternatively, in another embodiment, a longer sync sequence may, e.g., be used. This has a disadvantage of increased hardware effort in the correlator in the receiver.

When the sync sequence is inserted, the base pattern PRBS may, e.g., be stopped and started again, or it may, e.g., just be kept running for the whole sync header and may, e.g., be masked out while the sync sequence is inserted.

According to an embodiment, the first insertion of the sync sequence may, for example, be done with each bit/symbol doubled or tripled (or repeated more often). Repeating symbols improves robustness in detection and can additionally be used for coarse phase corrections, because the receiver will automatically obtain two or more samples from the same repeated symbol. This allows additional filtering and data processing to suppress noise and disturbances from the channel.

In an embodiment, the PRBS around the first insertion may, e.g., be kept without symbol repetition or it can be inserted with repeated symbols as well. The repetition of symbols in the sync sequence can only exceed the repetition of symbols in the PRBS by a small amount, because a significantly stretched sync sequence would yield false positives of the correlation with the PRBS.

In an embodiment, the second (or last) insertion of the sync sequence may, e.g., be without repetition of symbols, so that a correlation can give the exact bit position and allow aligned decoding of the payload data.

According to an embodiment, the position of the sync sequences inside the header may, e.g., be dithered to reduce/avoid peaks in the transmitter spectrum (power spectral density), which is important for electromagnetic sensitive applications such as Automotive and Aerospace. Dithering means shifting the position of the sync sequence by an integer number of symbols, e.g., inserting it into the sync header earlier or later with respect to a non-dithered "zero position" relative to the start of the payload data after the sync header.

In an embodiment, the dithering source may, for example, be a defined waveform (triangle, sine wave, rectangular, sawtooth, . . . ), or may, for example, be a pseudo-random signal like a PRBS. According to an embodiment, a clocked digital waveform for repeatable results may, e.g., be employed.

According to an embodiment, with each sync header, the dithering source may, e.g., be evaluated for a new position; which may, e.g., then be used for inserting the sync sequence (s) relative to their "zero position".

In an embodiment, there may, e.g., be a multiplication factor for the position obtained by the dithering source. This factor may, for example, be different for the first insertion of the sync sequence and the second (or last) insertion of the sync sequence.

For example, in an embodiment, the first insertion of the sync sequence with doubled bits/symbols may, for example, be shifted with a factor 2 while the second (or last) insertion may, for example, be shifted with a factor 1 (or more generally, with an integer ratio factor, that may, e.g., be half the value of the first sync sequence factor). This means, that the distance of correlator peaks of the first to second/last sync sequence is different from one data burst to the next data burst (and unique with each different position value obtained from the dithering source). This property can help to identify, which sync header (or data burst) within the period of the dithering source is currently evaluated.

For the first insertion of the sync sequence, it is not important, that the sync sequence is preceded by a field of PRBS. In an embodiment, this snippet of PRBS may, e.g., not be transmitted. This would lead to a sync header, which varies in length with each evaluation of the dithering source. If the first field is transmitted, the length of the sync header may, e.g., be always the same regardless of dithering state. This can be advantageous for CDR locking.

According to an embodiment, the sync header may, e.g., be appended by a fixed length info field, which may, for example, be used for transporting other data than the data burst payload.

Figure 6:
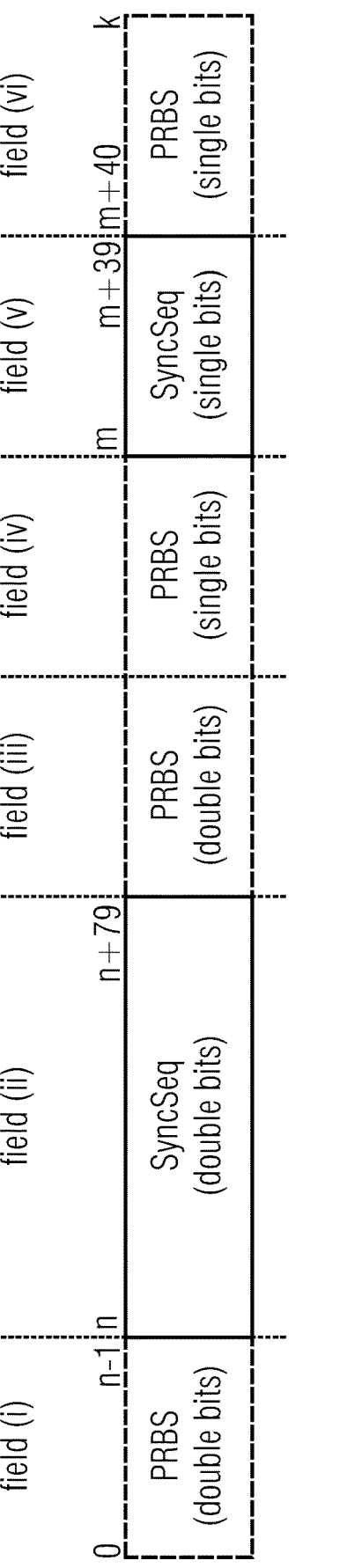
FIG. 6 illustrates a version of a sync header, with first insertion and PRBS around it with doubled bits according to an embodiment.

FIG. 6 illustrates a version of a sync header, with first insertion and PRBS around it with doubled bits according to an embodiment.

Figure 7:
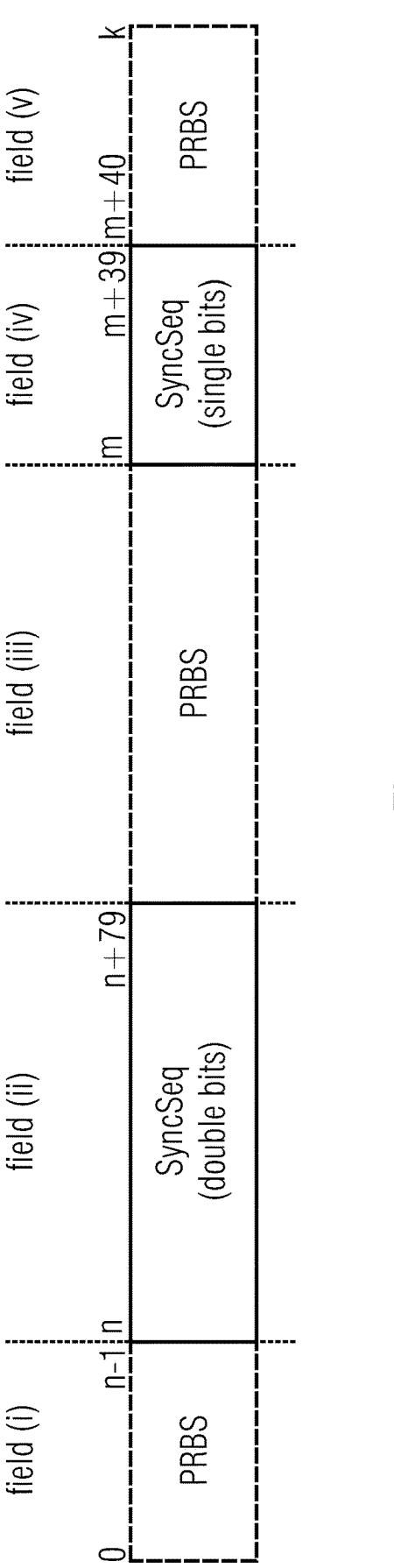
FIG. 7 illustrates a version of a sync header, with first insertion with doubled bits according to another embodiment.

FIG. 7 illustrates a version of a sync header, with first insertion with doubled bits according to another embodiment.

Figure 8:
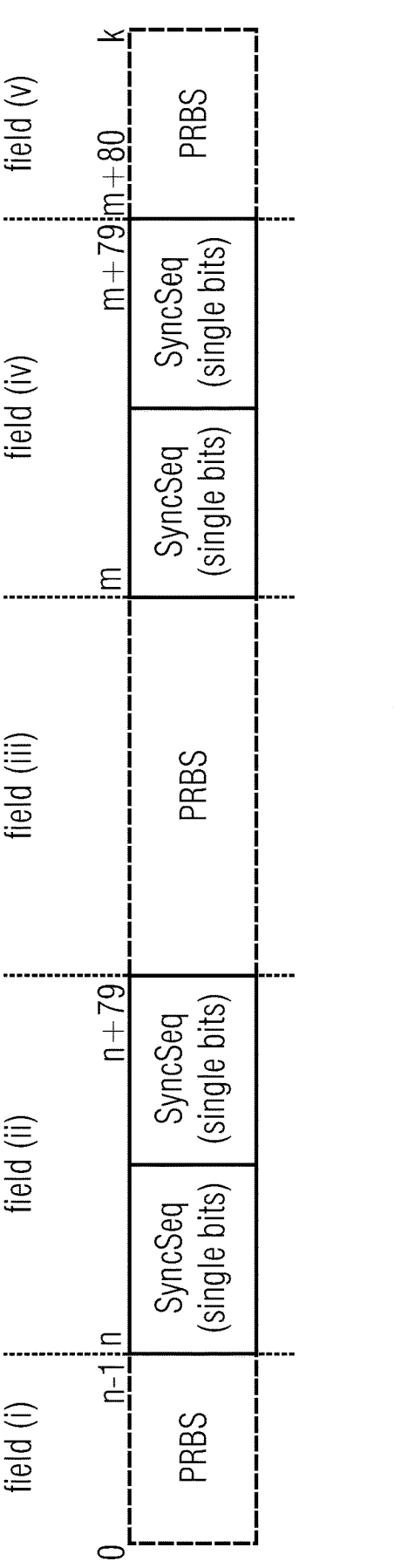
FIG. 8 illustrates a version of a sync header, with all insertions with single bits only, but whole sequence repeated, according to a further embodiment.

FIG. 8 illustrates a version of a sync header, with all insertions with single bits only, but whole sequence repeated, according to a further embodiment.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. There-fore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, there-fore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, there-fore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, con-figured to or adapted to perform one of the methods described herein.

A further embodiment comprises a computer having installed thereon the computer program for performing one of the methods described herein.

A further embodiment according to the invention com-prises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field program-mable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a com-bination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such altera-tions, permutations and equivalents as fall within the true spirit and scope of the present invention.

The invention claimed is:

1. An apparatus for generating a data stream, comprising:
a memory;
at least one processor coupled to the memory, wherein the apparatus is configured to generate the data stream, such that the data stream comprises header data and payload data, wherein the apparatus is configured to generate the header data such that the header data comprises a synchronization header, wherein the appa-ratus is configured to generate the synchronization header using binary coding, wherein the apparatus is configured to generate the synchronization header such that the synchronization header comprises a synchro-nization sequence being a predefined bit sequence comprising a plurality of bits, wherein the apparatus is configured to generate the synchronization header such that the synchronization header comprises a pseudo-random binary sequence, wherein the apparatus is configured to insert a doubling or tripling of each of two or more bits of the pseudo-random binary sequence into the synchronization header.

2. The apparatus according to claim 1,
wherein the apparatus is configured to generate the syn-chronization sequence which comprises a number of bits, such that a total number of transitions from a first bit value to a second bit value, being different from the first bit value, and from the second bit value to the first bit value within the synchronization sequence is greater than or equal to 35% of the number of the bits of the synchronization sequence; or is greater than or equal to 50% of the number of the bits of the synchronization sequence.

3. The apparatus according to claim 1,
wherein the apparatus is configured to generate the syn-chronization sequence, which comprises a first number of bits, such that
a first ratio
of a first total number of transitions from a first bit value to a second bit value, being different from the first bit value, and from the second bit value to the first bit value within the synchronization sequence
to
the first number of bits,
is greater than
a second ratio
of a second total number of transitions from the first bit value to the second bit value, and from the second bit value to the first bit value within the pseudo-random binary sequence, which comprises a second number of bits,
to
the second number of bits.

4. The apparatus according to claim 1,
wherein the apparatus is configured to generate the pseudo-random binary sequence by employing a linear feedback shift register.

5. The apparatus according to claim 1,
wherein the apparatus is configured to generate the pseudo-random binary sequence such that the pseudo-random binary sequence is different from the synchro-nization sequence; or wherein the apparatus is configured to generate the pseudo-random binary sequence only partially by starting with a defined seed value and running for a predefined number of shifts before resetting to the seed value; or wherein the apparatus is configured to generate the pseudo-random binary sequence which comprises a number of bits, such that a total number of transitions from a first bit value to a second bit value, being different from the first bit value, and from the second bit value to the first bit value within the pseudo-random binary sequence is greater than or equal to 15% of the number of the bits of the pseudo-random binary sequence; or wherein the apparatus is configured to generate the pseudo-random binary sequence such that the total number of transitions within the pseudo-random binary sequence is greater than or equal to 30% of the number of the bits of the pseudo-random binary sequence; or wherein the pseudo-random binary sequence is a selected pseudo-random binary sequence, and wherein the apparatus is configured to generate an initial pseudo-random binary sequence and to select a portion of the initial pseudo-random binary sequence, being smaller than the initial pseudo-random binary sequence, as the selected pseudo-random binary sequence; or wherein the apparatus is configured to assign a bit of the pseudo-random binary sequence to a bit position of the synchronization header where the apparatus is configured to insert a bit of the synchronization sequence, but is configured to not insert said bit of the pseudo-random binary sequence into the synchronization header.

6. The apparatus according to claim 1, wherein the apparatus is configured to stop using bits of the pseudo-random binary sequence when the apparatus inserts bits of the synchronization sequence into the synchronization header, and wherein the apparatus is configured to continue to insert a next bit of the pseudo-random binary sequence into the synchronization header, after the apparatus has inserted the bits of the synchronization sequence into the synchronization header.

7. The apparatus according to claim 1, wherein the apparatus is configured to generate the synchronization header such that the synchronization header exhibits at least one of the following properties:

the synchronization header comprises the synchronization sequence at least twice;

the synchronization header comprises the synchronization sequence more than twice;

the synchronization header comprises the synchronization sequence at a beginning of the synchronization header, and such that the synchronization header comprises the synchronization sequence at an end of the synchronization header;

the synchronization header comprises the synchronization sequence two times, concatenated, at the beginning of the synchronization header, and two times, concatenated, at the end of the synchronization header;

a second appearance of the synchronization sequence occurs immediately after a first appearance of the synchronization sequence within the synchronization header the synchronization sequence is a first synchronization sequence, and the header data comprises the first synchronization sequence and a second synchronisation sequence, the second synchronization sequence being different from the first synchronization sequence.

8. The apparatus according to claim 1, wherein the apparatus is configured to generate the synchronization header such that the synchronization header exhibits at least one of the following properties:

the synchronization header comprises a number of bits, such that a total number of transitions from a first bit value to a second bit value, being different from the first bit value, and from the second bit value to the first bit value within the synchronization header is greater than or equal to 15% of the number of the bits of the synchronization header;

the synchronization header is greater than or equal to 30% of the number of the bits of the synchronization header;

the synchronization header comprises a predefined short code;

the synchronization header comprises a predefined short code; wherein the predefined short code is 8B10B and 4B5B;

the synchronization header comprises a predefined field into the synchronization header to indicate that the synchronization header comprises a predefined length;

the synchronization header comprises an information field comprising a predefined length, wherein the information field comprises additional information;

the synchronization header comprises a predefined length;

the synchronization header comprises two or more predefined header fields.

9. The apparatus according to claim 1, wherein the apparatus is configured to generate a first version of the synchronization sequence by doubling or tripling each bit of an initial sequence, and wherein the apparatus is configured to generate the header data such that the synchronization header comprises the first version of the synchronization sequence.

10. The apparatus according to claim 9, wherein the apparatus is configured to generate the header data such that the synchronization header furthermore comprises a second version of the synchronization sequence, wherein the second version of the synchronization sequence is equal to the initial sequence; or wherein the apparatus is configured to generate the header data such that the synchronization header furthermore comprises a second version of the synchronization sequence, wherein the second version of the synchronization sequence is equal to the initial sequence and is configured to generate the header data such that the first version of the synchronization sequence precedes the second version of the synchronization sequence within the header data.

11. The apparatus according to claim 9, wherein the apparatus is configured to acquire the synchronization sequence from the initial sequence by changing positions of bits of the initial sequence.

12. The apparatus according to claim 11, wherein the apparatus is configured to change the positions of the bits of the initial sequence depending on a pseudo-random signal; or wherein the apparatus is configured to change the positions of the bits of the initial sequence depending on a multiplication factor wherein the multiplication factor depends on how many times the synchronization sequence has already been inserted by the apparatus into the header data; or wherein the apparatus is configured to change the positions of the bits of the initial sequence depending on a multiplication factor wherein the multiplication factor depends on how many times the synchronization sequence has already been inserted by the apparatus into the header data: and wherein for a second insertion of the synchronization sequence into the synchronization header, a second value of the multiplication factor is half of a first value of the multiplication factor used for a first insertion of the synchronization sequence into the header data; or wherein the apparatus is configured to change the positions of the bits of the initial sequence depending on a multiplication factor wherein the multiplication factor depends on how many times the synchronization sequence has already been inserted by the apparatus into the header data: and wherein for a second insertion of the synchronization sequence into the synchronization header, a second value of the multiplication factor is half of a first value of the multiplication factor used for a first insertion of the synchronization sequence into the header data; wherein the first value of the multiplication factor is 2, and wherein the second value of the multiplication factor is 1.

13. The apparatus according to claim 11, wherein the apparatus is configured to change the positions of the bits of the initial sequence depending on a defined waveform.

14. The apparatus according to claim 13, wherein at least one of the following conditions is fulfilled:

the defined waveform comprises a triangle shape or is a sine wave or comprises a rectangular shape or comprises a sawtooth shape; or wherein the apparatus is configured to employ a clocked digital waveform for changing the positions of the bits of the initial sequence.

15. The apparatus according to claim 1, wherein the apparatus is configured to generate the data stream such that the synchronization header of the data stream precedes the payload data of the data stream within the data stream; or wherein the apparatus is configured to generate the data stream such that the payload data is binary encoded; or wherein the apparatus is configured to generate the data stream such that the payload data is multi-level encoded;

wherein the apparatus is configured to generate the data stream using pulse amplitude modulation.

16. The apparatus according to claim 1, wherein the apparatus exhibits at least one of the following properties:

the apparatus is configured to transmit the data stream to a receiver;

the apparatus is configured to transmit the data stream via a shared medium.

17. The apparatus according to claim 1, wherein the apparatus is suitable for being employed in an automotive environment or in an aerospace environment.

18. An apparatus for receiving a data stream, comprising:

a memory;

at least one processor coupled to the memory, wherein the data stream comprises header data and payload data, wherein the header data comprises a synchronization header, wherein the synchronization header is binary encoded, wherein the synchronization header comprises a synchronization sequence being a predefined bit sequence comprising a plurality of bits, wherein the apparatus is configured to acquire the payload data of the data stream using the synchronization sequence of the synchronization header of the data stream, wherein the synchronization header comprises a pseudo-random binary sequence, wherein the synchronization header comprises a doubling or tripling of each of two or more bits of the pseudo-random binary sequence.

19. The apparatus according to claim 18, wherein the synchronization sequence comprises a number of bits, wherein a total number of transitions a first bit value to a second bit value, being different from the first bit value, and from the second bit value to the first bit value within the synchronization sequence is greater than or equal to 35% of the number of the bits of the synchronization sequence; or is greater than or equal to 50% of the number of the bits of the synchronization sequence.

20. The apparatus according to claim 18, wherein the synchronization sequence comprises a first number of bits, wherein a first ratio of a first total number of transitions from a first bit value to a second bit value, being different from the first bit value, and from the second bit value to the first bit value within the synchronization sequence to the first number of bits, is greater than a second ratio of a second total number of transitions from the first bit value to the second bit value, and from the second bit value to the first bit value within the pseudo-random binary sequence, which comprises a second number of bits, to the second number of bits.

21. The apparatus according to claim 18, wherein the pseudo-random binary sequence is different from the synchronization sequence; or wherein the pseudo-random binary sequence comprises a number of bits, wherein a total number of transitions from a first bit value to a second bit value, being different from the first bit value, and from the second bit value to the first bit value within the pseudo-random binary sequence is greater than or equal to 15% of the number of the bits of the pseudo-random binary sequence; or wherein the pseudo-random binary sequence comprises a number of bits, wherein a total number of transitions from a first bit value to a second bit value, being different from the first bit value, and from the second bit value to the first bit value within the pseudo-random binary sequence is greater than or equal to 15% of the number of the bits of the pseudo-random binary sequence; wherein the total number of transitions within the pseudo-random binary sequence is greater than or equal to 30% of the number of the bits of the pseudo-random binary sequence.

22. The apparatus according to claim 18,
wherein the synchronization header exhibits at least one
of the following properties:
    the synchronization header comprises the synchroniza-
        tion sequence at least twice,
    wherein the synchronization header comprises the syn-
        chronization sequence at a beginning of the synchro-
        nization header, and the synchronization header
        comprises the synchronization sequence at an end of
        the synchronization header;
    the synchronization header comprises the synchroniza-
        tion sequence two times, concatenated, at the begin-
        ning of the synchronization header, and two times,
        concatenated, at the end of the synchronization
        header;
    a second appearance of the synchronization sequence
        occurs immediately after a first appearance of the
        synchronization sequence within the synchroniza-
        tion header;
    the synchronization sequence is a first synchronization
        sequence, and the header data comprises the first
        synchronization sequence and a second synchroni-
        sation sequence, the second synchronization
        sequence being different from the first synchroniza-
        tion sequence;
    the synchronization header comprises a first version of
        the synchronization sequence, the first version com-
        prising a doubling or tripling each bit of an initial
        sequence; the synchronization header furthermore
        comprises a second version of the synchronization
        sequence, wherein the second version of the syn-
        chronization sequence is equal to the initial
        sequence;
    the synchronization header comprises a first version of
        the synchronization sequence, the first version com-
        prising a doubling or tripling each bit of an initial
        sequence; the synchronization header furthermore
        comprises a second version of the synchronization
        sequence, wherein the second version of the syn-
        chronization sequence is equal to the initial
        sequence; wherein the first version of the synchro-
        nization sequence precedes the second version of the
        synchronization sequence within the header data.
23. The apparatus according to claim 18,
wherein the synchronization header exhibits at least one
of the following properties:
    the synchronization header comprises a number of bits,
        such that a total number of transitions from a first bit
        value to a second bit value, being different from the
        first bit value, and from the second bit value to the
        first bit value within the synchronization header is
        greater than or equal to 15% of the number of the bits
        of the synchronization header;
    the total number of transitions within the synchroniza-
        tion header is greater than or equal to 30% of the
        number of the bits of the synchronization header;
    the synchronization header comprises a predefined
        short code;
    the synchronization header comprises a predefined
        short code; wherein the predefined short code is
        8B10B and 4B5B;
    the synchronization header comprises a first version of
        the synchronization sequence, the first version com-
        prising a doubling or tripling each bit of an initial
        sequence;

the synchronization header comprises a predefined field
        into the synchronization header to indicate that the
        synchronization header comprises a predefined
        length;
    the synchronization header comprises an information
        field comprising a predefined length, wherein the
        information field comprises additional information;
    wherein the synchronization header of the data stream
        precedes the payload data of the data stream within
        the data stream;
    the synchronization header comprises a predefined
        length;
    the synchronization header comprises two or more
        predefined header fields.
24. The apparatus according to claim 18,
wherein the payload data exhibits at least one of the
    following properties:
    the payload data is binary encoded;
    the payload data is multi-level encoded.
25. The apparatus according to claim 18,
wherein the data stream is pulse amplitude modulation
    encoded.
26. The apparatus according to claim 18,
wherein the apparatus exhibits at least one of the follow-
    ing properties:
    the apparatus is configured to receive the data stream
        from a transmitter;
    the apparatus is configured to receive the data stream
        via a shared medium.
27. The apparatus according to claim 18,
wherein the apparatus is suitable for being employed in an
    automotive environment or in an aerospace environ-
    ment.
28. The apparatus according to claim 18,
wherein the apparatus is configured to synchronize a
    clock timing using the synchronization sequence of the
    synchronization header of the data stream, and wherein
    the apparatus is configured to acquire the payload data
    of the data stream using the using the clock timing.
29. The apparatus according to claim 28,
wherein the apparatus is configured to synchronize a
    phase of a sampling clock using the synchronization
    sequence of the synchronization header of the data
    stream to synchronize the clock timing; or
wherein the apparatus is configured to recover the clock
    timing using the synchronization header when the
    apparatus starts to receive the data stream; or
wherein the apparatus is configured to recover the clock
    timing using the synchronization header; or
wherein the apparatus is configured to track a frequency
    of the clock timing during a reception of the data
    stream.
30. The apparatus according to claim 29,
wherein the apparatus is configured to center the sampling
    clock in a symbol period using the synchronization
    header.
31. The apparatus according to claim 18,
wherein the apparatus is configured to synchronize a
    clock timing using the synchronization sequence of the
    synchronization header of the data stream,
wherein the apparatus is configured to acquire the payload
    data of the data stream using the using the clock timing,
    and
wherein the apparatus is configured to recover the clock
    timing using the pseudo-random binary sequence.

32. The apparatus according to claim 18,
wherein the apparatus is configured to detect a beginning of the payload data of the data stream using the synchronization sequence.

33. The apparatus according to claim 18,
wherein the apparatus is configured to identify the synchronization sequence within the data stream by employing correlation.

34. A system comprising:
an apparatus for generating a data stream, comprising:
  a memory;
  at least one processor coupled to the memory, wherein the apparatus is configured to generate the data stream, such that the data stream comprises header data and payload data, wherein the apparatus is configured to generate the header data such that the header data comprises a synchronization header, wherein the apparatus is configured to generate the synchronization header using binary coding, wherein the apparatus is configured to generate the synchronization header such that the synchronization header comprises a synchronization sequence being a predefined bit sequence comprising a plurality of bits, wherein the apparatus is configured to generate the synchronization header such that the synchronization header comprises a pseudo-random binary sequence, wherein the apparatus is configured to insert a doubling or tripling of each of two or more bits of the pseudo-random binary sequence into the synchronization header, and
an apparatus for receiving a data stream, comprising:
  a memory;
  at least one processor coupled to the memory, wherein the data stream comprises header data and payload data, wherein the header data comprises a synchronization header, wherein the synchronization header is binary encoded, wherein the synchronization header comprises a synchronization sequence being a predefined bit sequence comprising a plurality of bits, wherein the apparatus is configured to acquire the payload data of the data stream using the synchronization sequence of the synchronization header of the data stream, herein the apparatus for generating a data stream is configured to generate the data stream, such that the data stream comprises header data and payload data, wherein the apparatus for generating a data stream is configured to generate the header data such that the header data comprises a synchronization header, wherein the apparatus for generating a data stream is configured to generate the synchronization header using binary coding, wherein the apparatus for generating a data stream is configured to generate the synchronization header such that the synchronization header comprises a synchronization sequence being a predefined bit sequence comprising a plurality of bits, wherein the apparatus for receiving a data stream is configured to acquire the payload data of the data stream using the synchronization sequence of the synchronization header of the data stream.

35. A method for generating a data stream, wherein the method is conducted by an apparatus being implemented as a hardware apparatus, comprising:
  generating the data stream, such that the data stream comprises header data and payload data,
  wherein generating the header data is conducted such that the header data comprises a synchronization header, wherein generating the synchronization header is conducted using binary coding,
wherein generating the synchronization header is conducted such that the synchronization header comprises a synchronization sequence being a predefined bit sequence comprising a plurality of bits,
wherein generating the synchronization header is conducted such that the synchronization header comprises a pseudo-random binary sequence,
wherein the method comprises inserting a doubling or tripling of each of two or more bits of the pseudo-random binary sequence into the synchronization header.

36. A method for receiving a data stream, wherein the method is conducted by an apparatus being implemented as a hardware apparatus,
  wherein the data stream comprises header data and payload data, wherein the header data comprises a synchronization header, wherein the synchronization header is binary encoded, wherein the synchronization header comprises a synchronization sequence being a predefined bit sequence comprising a plurality of bits,
  wherein the method comprises acquiring the payload data of the data stream using the synchronization sequence of the synchronization header of the data stream,
  wherein the synchronization header comprises a pseudo-random binary sequence,
  wherein the synchronization header comprises a doubling or tripling of each of two or more bits of the pseudo-random binary sequence.

37. A non-transitory digital storage medium having stored thereon a computer program for performing a method for generating a data stream, comprising:
  generating the data stream, such that the data stream comprises header data and payload data,
  wherein generating the header data is conducted such that the header data comprises a synchronization header,
  wherein generating the synchronization header is conducted using binary coding,
  wherein generating the synchronization header is conducted such that the synchronization header comprises a synchronization sequence being a predefined bit sequence comprising a plurality of bits,
  wherein generating the synchronization header is conducted such that the synchronization header comprises a pseudo-random binary sequence,
  wherein the method comprises inserting a doubling or tripling of each of two or more bits of the pseudo-random binary sequence into the synchronization header,
  when said computer program is run by a computer.

38. A non-transitory digital storage medium having stored thereon a computer program for performing a method for receiving a data stream,
  wherein the data stream comprises header data and payload data, wherein the header data comprises a synchronization header, wherein the synchronization header is binary encoded, wherein the synchronization header comprises a synchronization sequence being a predefined bit sequence comprising a plurality of bits,
  wherein the method comprises acquiring the payload data of the data stream using the synchronization sequence of the synchronization header of the data stream,
  wherein the synchronization header comprises a pseudo-random binary sequence, wherein the synchronization header comprises a doubling or tripling of each of two or more bits of the pseudo-random binary sequence, when said computer program is run by a computer.

\* \* \* \* \*